March 30, 1926.

L. A. EDELMANN 1,578,966

CHUCK

Filed Oct. 4, 1922        2 Sheets-Sheet 1

INVENTOR
Louis A. Edelmann

BY
*Ralph Kalish*
ATTORNEY

March 30, 1926.

L. A. EDELMANN

CHUCK

Filed Oct. 4, 1922

INVENTOR
*Louis A. Edelmann*

BY
*Ralph Kalish*
ATTORNEY

Patented Mar. 30, 1926.

1,578,966

UNITED STATES PATENT OFFICE.

LOUIS A. EDELMANN, OF ST. LOUIS, MISSOURI, ASSIGNOR TO UNICO MOTOR PRODUCTS CORPORATION, OF ST. LOUIS, MISSOURI, A CORPORATION OF MISSOURI.

CHUCK.

Application filed October 4, 1922. Serial No. 592,306.

*To all whom it may concern:*

Be it known that I, LOUIS A. EDELMANN, a citizen of the United States, residing at the city of St. Louis, State of Missouri, have invented a certain new and useful Improvement in Chucks, of which the following is a specification, reference being had to the accompanying drawings, forming a part thereof.

This invention relates generally to work-holding devices and, more particularly, to a certain new and useful improvement in work-holding devices of the class commonly known as chucks.

The principal object of my present invention is to provide an efficient chuck of relatively simple and inexpensive form and construction adapted especially for the rigid holding or gripping of tubular objects during the machining, grinding, or other operations upon their outer surface.

Other objects of my present invention are to provide a chuck of the kind stated which may be readily installed upon the turning or other machine, which may be conveniently and economically repaired and its parts repaced or renewed when necessary or required through wear, breakage, or other cause, which may be accurately adjusted with facility to accommodate tubular work of different lengths and diameters, and which is actuatable with ease, rapidity, and precision.

With the above and also other objects in view, my present invention resides in the novel features of form, construction, arrangement, and combination of parts hereinafter described and afterwards pointed out in the claims.

In the accompanying drawings—

Figures 1, 2, 3:
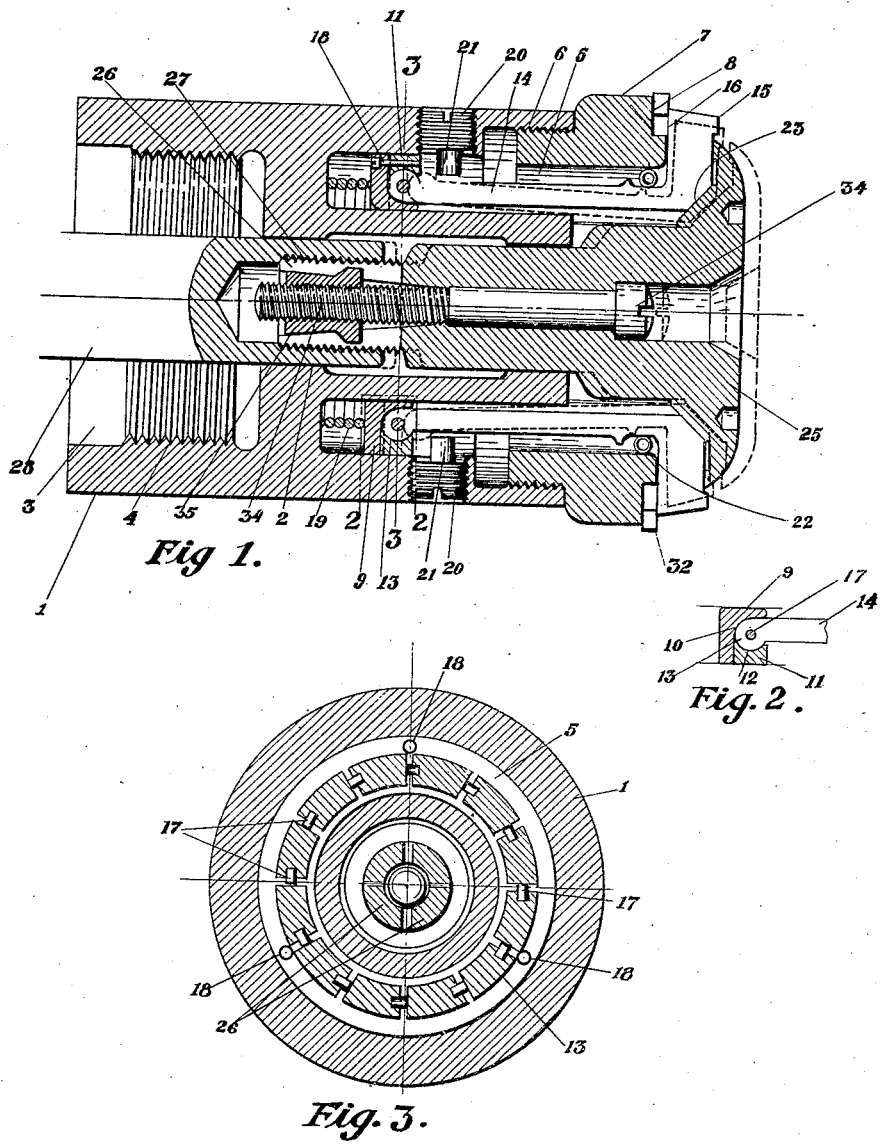
Figure 1 is a longitudinal sectional view of a chuck embodying my invention.
Figure 2 is a detail sectional view of the chuck taken approximately on the line 2—2, Figure 1.
Figure 3 is a transverse sectional view of the chuck on approximately the line 3—3, Figure 1.

Referring now more in detail and by reference characters to the accompanying drawings, which illustrate a preferred embodiment of my invention, 1 indicates the body of the device, which is preferably in the form of a cylindrical steel bar or rod of suitable diameter having a spindle-bore 2 and counter-bored at one end, as at 3, and internally threaded, as at 4, for convenient attachment upon the turning machine, as will be understood. At its other or opposite end, the bar or body 1 is formed around its bore 2 with what may be described as an annular chamber 5 and is also internally threaded, as at 6; and substantially forming a part of and removably fitted in the body at its threaded end 6, is a ring 7 of steel or other suitable hard metal, upon the forwardly presented face 8 of which the work may be concentrically or eccentrically held.

Disposed for sliding movement in the chamber 5 of bar or body 1, is an annular jaw retaining member comprising a ring 9 having a concaved face 10 and a second ring 11 having a circumferential groove 12 upon its outer perimeter, the rings 9 and 11 and their co-operating faces 10 and 12 providing an annular pivot or journal seat for the correspondingly arcuated rear ends 13 of a plurality of suitably elongated separate or independent shanks or stems 14 each provided at its free outer or forward end with a head or jaw proper 15. As best seen in Figures 1, 2, and 3, the jaw-stems or shanks 14 are lengthwise disposed forwardly in body-chamber 5 and the several heads or jaws proper 15 project angularly outwardly from the free ends of the stems 14, each head or jaw proper 15 having opposite faces rearwardly and forwardly presented relatively to the shank and the several heads or jaws proper being disposed in an annular series forwardly of, and adapted for work-holding or engaging co-operation at their rearwardly presented faces 16 with, the body or ring 7. As best seen in Figure 2, the outer wall of groove 12 in the retaining-ring 11 is of greater diameter than the other or inner wall thereof, whereby the several jaws 15 have certain freedom for independent swingable or pivotal movement relatively to the ring 7; and to facilitate assemblage of the several jaws 15 at their shank-ends 13 with the rings 9 and 11 and to also facilitate proper independent swingable movement of the several jaws 15, the several jaw-shanks 14 are suitably equidistantly spaced at their pivot or journal ends 13 by means of lateral stubs or pins 17, the rings 9 and 11 being in due course rigidly fastened together by screws or the like 18 and the jaws 15 thereby maintained in proper swingable relation to one another and to the ring 7.

Figure 4:
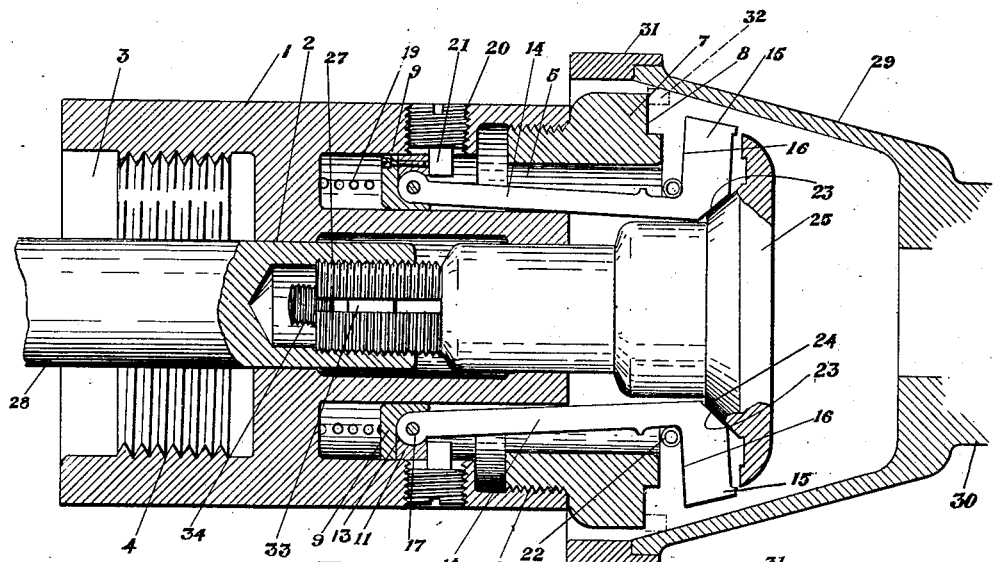
Figure 4 is a longitudinal sectional view of the chuck taken approximately on its vertical center line, the jaws of the chuck being in work receiving-position and illustrated in connection with a feeding-device.
Figure 5:
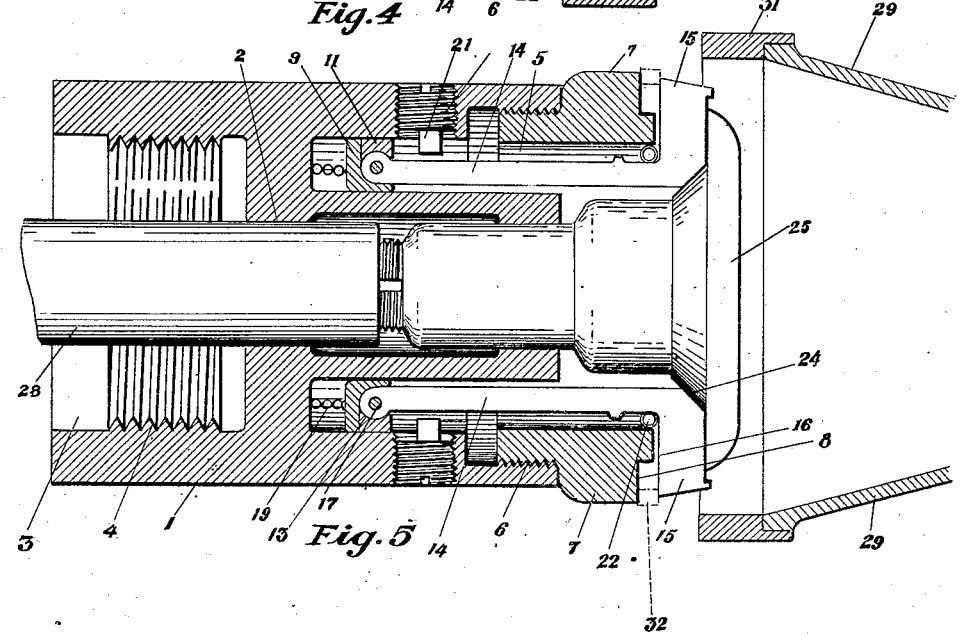
Figure 5 is a similar view of the chuck with its jaws in work-engaging position, the work feeding-device being retracted.

Disposed in chamber 5 rearwardly of ring 9, is a coiled expansion spring or the like 19 adapted to yieldingly maintain the series of jaws 15 in forwardly spaced relation from the ring 7; and fitted in the bar 1 are oppositely disposed screws 20 having inwardly presented protruding pins 21 adapted for engagement with the ring 11 to limit the forward sliding movement in chamber 5 of the rings 9 and 11 and consequently also the swinging movement of the series of jaws 15 relatively to and away from the ring 7, the several jaws 15 being yieldingly held in contracted relation out of engagement with the ring 7 and inwardly towards the center or axis of bar 1 by means of a suitable coiled spring 22 disposed around and embracing the shanks 14 thereof, as best seen in Figures 1, 4, and 5.

Forming part of the forwardly presented face of each head or jaw proper 15, is a beveled or cam portion 23, and disposed forwardly of the series of jaws 15 and having a rearwardly presented beveled or cam annular face 24 adapted for co-operation with the several cam-faces 23 of the jaws 15, is a so-called jaw-spreading or cam-member 25 having a shank 26 extending rearwardly in bore 2 of bar 1 and having threaded connection or attachment, as at 27, with the usual shiftable draw-rod 28 of the turning-machine.

I have heretofore employed my new chuck in the machining and turning of engine piston or packing-rings. For such use, the chuck is especially adapted, and, as an application of the chuck, I have illustrated the same in that relation, showing the chuck in connection with a feeding device which I prefer to employ to not only obviate relatively slow and unsafe hand-feeding, but to also effect rapidity of feeding with safety to the operator. Such feeding device comprises a hopper or substantially bell-shaped body 29 adapted for attachment at its shank 30 to and upon a shiftable shaft of the turning-machine, not shown, the axis of body 29 being in longitudinal alignment or registration with the axes of jaw-spreader 25 and ring 7. Fixed to and upon the peripheral edge of body 29 and having a diameter somewhat greater than the diameter of ring 7, as seen in Figures 4 and 5, is a feeding-ring 31.

In operation, assume the annular series of jaws 15 and their co-operating spreading-member 25 to be in so-called normal or non-work engaging position or in the position thereof illustrated in full lines in Figure 4 and in dotted lines in Figure 1, and feeding-bell 29 to be in its retracted position illustrated in Figure 5. A packing or piston-ring 32 to be machined is now suitably placed within the feeding-bell 29, and the feeding-bell 29 then shifted axially to locate or place the ring 32 against the forward face 8 of ring 7, as illustrated in Figure 4. With ring 32 so held, draw-bar 28 and consequently also its attached cam-member or jaw-spreader 25 are, in turn, shifted against the tension of spring 19, when, under the cam-engagement between the member 25 and the several jaws 15 at their co-operating or engaging faces 24 and 23, the several jaws 15 are radially hingedly or pivotally expanded against the tension of their contracting spring 22 into the position thereof illustrated in Figures 1 and 5 to engage the ring 32 at their faces 16, the ring 32 to be machined being thereby firmly and rigidly gripped and held by and between the ring 7 and the series of jaws 15. The feeding-bell 29 and its feeding-ring 30 are now oppositely shifted or retracted to normal position to expose the outer circumference of the ring 32 for machining or other desired operation. Operations upon the ring 32 being completed, bar 28 and its attached jaw spreading member 25 are likewise oppositely or forwardly shifted, whereupon, under the tension of springs 19 and 22, the series of jaws 15 are yieldingly collapsed or actuated to non-work engaging or normal position or again into the position thereof illustrated in full lines in Figure 4 and in dotted lines in Figure 1, the finished ring 32 being released and suitably ejected from the machine.

My new chuck in its several parts may be economically produced, is applicable for use in connection with, and may be conveniently installed upon practically all forms or types of turning machines, and is exceedingly precise, accurate, and efficient in the performance of its intended functions, and I may add that a distinct advantage and economy accruing from the construction of chuck here described is that, in the event of breakage of any one of the jaws 25 or their shanks 14 or other of its parts, repair or replacement thereof may be readily made without necessitating the scrapping or discarding of all the jaws or the chuck as a whole. It will be seen that the pins 21 are preferably eccentrically disposed relatively to the screws 20, whereby adjustment in the travel of rings 9—11 and consequently also adjustment in the swingable movement of the several jaws 15 may be effected to accommodate rings 32 or other work of different lengths and diameters. It will also be observed that, following the threaded connection between the shank 26 of cam-member or plunger 25 with the bar or spindle 28 of the machine, the location and shiftable movement of member 25 relatively to the jaws 15 may be likewise conveniently adjusted, the cam-member shank 26 being split at its threaded end, as at 33, and the member 25 in such adjusted position being locked to spindle 28 by means of a bolt 34 disposed longitudinally through the shank 26 of member 25 and engaging a shank-expanding nut 35 disposed for the purpose within the split end of shank 26, as best seen in Figures 1 and 4. It will further be observed that, following the described construction of the chuck and its several parts, repairs and replacements of the various parts of the chuck may be made with facility without necessitating removal of the chuck as a whole from the machine.

It will be readily understood that changes in the size, form, construction, arrangement, and combination of the various parts of my new chuck may be made and substituted for those herein shown and described without departing from the nature and principle of my invention.

Having thus described my invention, what I claim and desire to secure by Letters Patent is:

1. A chuck including, in combination, an annular work-engaging body, a plurality of swingable jaws, each jaw comprising a shank and an outwardly projecting head having opposite faces rearwardly and forwardly presented relatively to the body, said jaws being disposed normally in a yieldingly contracted annular series with their heads presented forwardly of the body and being slidable relatively to and swingable towards the body, and means adapted for engagement with the jaws at the forwardly presented faces of their heads for slidably and radially expanding the jaws to engage the work between the body and the rearwardly presented faces of their heads.

2. A chuck including, in combination, an annular body, a plurality of swingable jaws, each jaw comprising a shank and an outwardly projecting head having opposite faces rearwardly and forwardly presented relatively to the body, said jaws being disposed normally in a yieldingly contracted annular series with their heads presented forwardly of the body and being yieldingly slidable relatively to and swingable towards the body, and means comprising an axially shiftable member adapted for engagement with the jaws at the forwardly presented faces of their heads for slidably and radially expanding the jaws to engage the work between the body and the rearwardly presented faces of their heads.

3. A chuck including, in combination, an annular body, a ring-shaped member yieldingly axially slidable in the body, a plurality of swingable jaws, each jaw comprising a shank pivoted at an end upon said member and having an outwardly projecting head at its opposite end provided with opposite faces rearwardly and forwardly presented relatively to the body, said jaws being disposed normally in a yieldingly contracted annular series with their heads presented forwardly of the body, and means comprising an axially shiftable member adapted for engagement with the jaws at the forwardly presented faces of their heads for slidably and radially expanding the jaws to engage the work between the body and the rearwardly presented faces of their heads.

4. A chuck including, in combination, an annular body, a ring-shaped member yieldingly axially slidable in the body, a plurality of swingable jaws, each jaw comprising a shank pivoted at an end upon said member and having an outwardly projecting head at its opposite end provided with opposite faces rearwardly and forwardly presented relatively to the body, said jaws being disposed normally in a yieldingly contracted annular series with their heads presented forwardly of the body, means comprising an axially shiftable member adapted for engagement with the jaws at the forwardly presented faces of their heads for slidably and radially expanding the jaws to engage the work between the body and the rearwardly presented faces of their heads, and means for adjustably varying the movement of the jaws relatively to the body to accommodate work of different thickness.

5. A chuck including, in combination, an annular body, a ring-shaped member yieldingly axially slidable in the body, a plurality of swingable jaws, each jaw comprising a shank pivoted at an end upon said member and having an outwardly projecting head at its opposite end provided with opposite faces rearwardly and forwardly presented relatively to the body, said jaws being disposed normally in a yieldingly contracted annular series with their heads presented forwardly of the body, and means for slidably and radially expanding the jaws to engage the work between the body and the rearwardly presented faces of their heads, said means comprising a spindle disposed within and shiftable axially relatively to the body, a shanked member adapted for engagement with the forwardly presented faces of the heads of the jaws, and means for locking said member at its shank to the spindle.

In testimony whereof, I have signed my name to this specification.

LOUIS A. EDELMANN.